United States Patent
McClatchy et al.

(10) Patent No.: US 9,912,384 B1
(45) Date of Patent: Mar. 6, 2018

(54) TRACKING PERSONNEL ACCESS TO AIRCRAFT ON THE GROUND

(71) Applicant: ROCKWELL COLLINS, INC., Cedar Rapids, IA (US)

(72) Inventors: Diane D. McClatchy, Annapolis, MD (US); Matthew M. Lorch, Alburnett, IA (US); Subhashish Chakravarty, Marion, IA (US); Adam Mottram, Horsham (GB)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/256,604

(22) Filed: Sep. 4, 2016

(51) Int. Cl.
| H04B 5/00 | (2006.01) |
| H04W 4/00 | (2018.01) |
| G06K 19/077 | (2006.01) |
| G06K 19/06 | (2006.01) |
| G07C 9/00 | (2006.01) |

(52) U.S. Cl.
CPC ..... *H04B 5/0062* (2013.01); *G06K 19/06037* (2013.01); *G06K 19/0776* (2013.01); *G07C 9/00111* (2013.01); *H04W 4/008* (2013.01)

(58) Field of Classification Search
CPC ...... G07C 9/00309; G07C 2009/00793; G07C 9/00571; G07C 9/00111; G07C 9/00103; G07C 2209/63; G07C 9/00904

USPC .......................................................... 340/5.61
See application file for complete search history.

(56) References Cited

U.S. PATENT DOCUMENTS

| 8,624,727 | B2* | 1/2014 | Saigh | H04W 4/025 340/539.1 |
| 8,880,047 | B2* | 11/2014 | Konicek | H04M 1/72513 455/414.1 |
| 9,418,263 | B2* | 8/2016 | Butler | H04L 67/1097 |
| 9,551,781 | B2* | 1/2017 | Baxley | G01S 5/0263 |
| 2016/0321480 | A1* | 11/2016 | Hamlin | G06K 19/07766 |
| 2017/0018184 | A1* | 1/2017 | Northrup | G08G 1/144 |

* cited by examiner

*Primary Examiner* — Mark Blouin
(74) *Attorney, Agent, or Firm* — Angel N. Gerdzhikov; Donna P. Suchy; Daniel M. Barbieri

(57) ABSTRACT

A system and method are provided for tracking access. At least one passive wireless identification device is provided at a personnel access point. Communication is established between a mobile device and the at least one passive wireless identification device when the mobile device passes the personnel access point. Occurrences of the established communication between the mobile device and the at least one passive wireless identification device are separately communicated to a remote data collection device. The occurrences of the established communication between the mobile device and the at least one passive wireless identification device are recorded in the remote data collection device. Data based on the recorded occurrences of the established communication between the mobile device and the at least one passive wireless identification device is output from the remote data collection device.

20 Claims, 4 Drawing Sheets

TRACKING PERSONNEL ACCESS TO AIRCRAFT ON THE GROUND

BACKGROUND

The inventive concepts disclosed herein relate to systems and methods for tracking ground access to aircraft by establishing communication between passive wireless tags or stickers mounted at an access of an aircraft and near field communication (NFC) enabled mobile devices, the communications being established momentarily upon entry and exit through the access, to record, for example, entry and egress of personnel, including aircraft cleaning crews, as an input for a calculation of delay metrics with regard to aircraft turnarounds.

Airlines and other commercial passenger air carriers operate according to fairly rigid operating schedules. The systems that ensure a constant flow of passengers and freight between destinations, including meeting intermediate connections according to an organized process, are at once fairly robust, and yet fairly inflexible in the ability to deal with disruptions and/or delays.

Most aspects of movement operations for a particular airline or other air carrier are precisely tracked from pushback at the departure gate through taxi and takeoff, via enroute flight tracking, and in the terminal phase evolutions of approach, landing, taxi and arrival at the arrival gate. In recent years, increasing awareness has been placed on monitoring of all aspects of ground turnaround evolutions while a particular aircraft is parked on the ramp or at the gate. It is in the best interest of the air carriers, from a business perspective, to exercise precise control over aircraft ground operations including expediting aircraft turnaround evolutions with all that those evolutions entail. Efficiencies are sought in debarking passengers, unloading luggage and cargo, fueling, cabin cleanup, resupply of cabin essentials (including onboard meals), loading luggage and cargo and ultimately embarking passengers for the next leg.

Each of the discrete evolutions of baggage and cargo handling, fueling, cabin cleanup and cabin resupply are generally undertaken by separate crews specialized to the particular tasks. The fueling, cabin cleanup and cabin resupply evolutions are most often completed by crews that are associated with, or contracted by, the air terminal rather than by any individual air carrier. Fueling and resupply operations are fairly precisely tracked. Almost every aspect of these operations can be directly measured from, for instance, monitoring a status and location of the fuel trucks, the catering trucks and the like via some manner of data link or other discrete communication interface. From the direct measurement of those operations, a broad description of progress of the turnaround may be obtained.

According to certain air carriers, the one metric associated with an aircraft turnaround that they remain unable to measure "directly" is the progress of the cleaning crew in preparing the aircraft cabin between flight legs. Put another way, the time that a cleaning crew spends picking up newspapers, picking up trash, and the like, and simply getting on and off the aircraft is "invisible" to any currently-fielded automated monitoring schemes.

SUMMARY

Exemplary embodiments according to the inventive concepts disclosed herein may provide a system and method for tracking access. At least one passive wireless identification device is provided at a personnel access point. Communication is established between a mobile device and the at least one passive wireless identification device when the mobile device passes the personnel access point. Occurrences of the established communication between the mobile device and the at least one passive wireless identification device are separately communicated to a remote data collection device. The occurrences of the established communication between the mobile device and the at least one passive wireless identification device are recorded in the remote data collection device. Data based on the recorded occurrences of the established communication between the mobile device and the at least one passive wireless identification device is output from the remote data collection device.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed systems and methods for tracking ground access to aircraft by establishing communication between passive wireless tags mounted at an access of an aircraft and near field communication (NFC) enabled mobile devices upon entry and exit through the access, to record, for example, entry and egress of aircraft cleaning crews as an input for the calculation of delay metrics with regard to aircraft turnarounds, will be described, in detail, with reference to the following drawings, in which.

DETAILED DESCRIPTION

Figure 1:
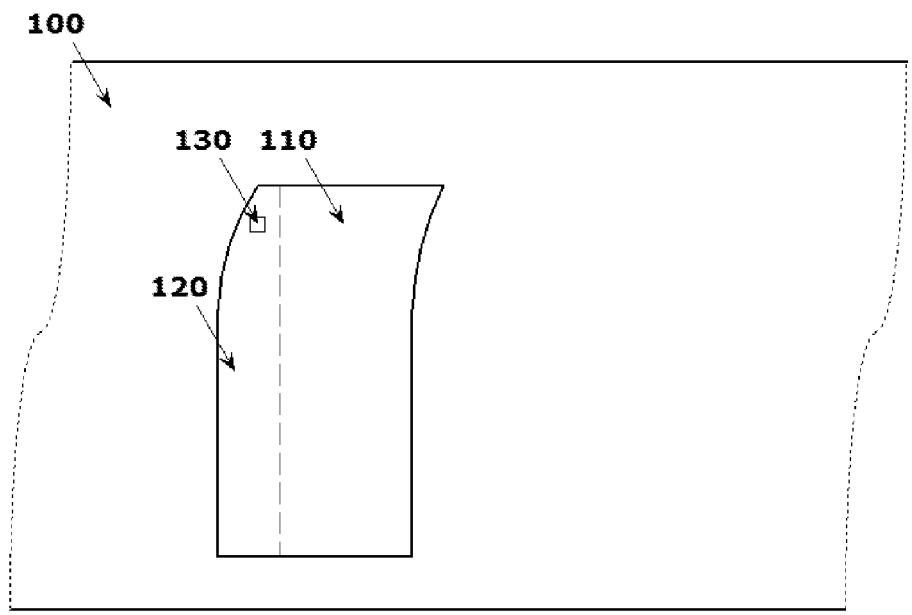
FIG. 1 illustrates an exemplary embodiment of an installation of an RFID tag or sticker in proximity to an aircraft external access according to the inventive concepts disclosed herein.

The disclosed systems and methods for tracking ground access to aircraft by establishing communication between passive wireless tags mounted at an access of an aircraft and near field communication (NFC) enabled mobile devices upon entry and exit through the access, to record, for example, entry and egress of aircraft cleaning crews as an input for the calculation of delay metrics with regard to aircraft turnarounds, will generally refer to this specific utility for those systems and methods. Exemplary embodiments described and depicted in this disclosure should not be interpreted as being specifically limited to any particular configuration of a wireless tag or passive transmitter, or of a cooperating mobile communication device by which local communication may be established with the wireless tag or passive transmitter. Any advantageous use of a localized communication with a passive communication device to track, for example, entry to and exit from a particular space in which mounting of an active communicating component may not be preferred, or may be substantially prohibited, that may benefit from implementation of an automated personnel tracking scheme according to the inventive concepts disclosed herein, to any one of a number of beneficial purposes, is contemplated. Data collection and analysis supported by the disclosed tracking schemes may provide end users with information by which to effectively and efficiently modify and/or streamline operations, including aircraft ground turnaround operations.

The disclosed automated personnel tracking schemes may separately provide a capacity for some level of additional management and control of currently-untracked assets to ensure timely accomplishment of certain tasks, or to evaluate conditions that may adversely affect, for example, accomplishment of specific tasks including, but not limited to aircraft cabin cleaning operations. The disclosed schemes may also provide a streamlined capacity by which to evaluate individual crew member or team task completion. Any such advantageous use of the systems, methods, processes, techniques, schemes and/or implementations according to the inventive concepts disclosed herein is considered as being incorporated in the following description of particular exemplary embodiments.

As noted above, embodiments according to the inventive concepts disclosed herein will be described as being particularly adaptable to automated personnel tracking scenarios for individuals entering and exiting aircraft through particular access points, including tracking cleaning crews during aircraft ground turnaround evolutions. This focus is not intended to preclude the adaptability of the disclosed systems and methods to beneficial employment by participating communicating devices in other employment scenarios. Any reference to a particular employment scenario for the disclosed automated personnel tracking schemes should be understood to be illustrative only in providing a descriptive real-world utility for the disclosed systems and methods, and should not be considered as limiting the disclosed systems and methods in any way.

Additional features and advantages of the disclosed embodiments will be set forth in the description that follows, and in part will be obvious from the description, or may be learned by practice of the disclosed embodiments. The features and advantages of the disclosed embodiments may be realized and obtained by means of the instruments and combinations particularly pointed out in the appended claims.

Among the objectives of the disclosed schemes is to fill a gap for timing and scoring third party companies providing replenishing and cleanup for aircraft on ground turnarounds. A combination of NFC technology and RFID tags or stickers may be employed to track when cleaning crews enter the aircraft to commence cleaning and replenishment tasks, and when those cleaning crews exit the aircraft upon completion of those tasks. In embodiments, centralized data collection may be implemented for individual air carriers, and metrics and scoring of the various service providers provided for review. Alternatively, a mobile device capable of reading a QR code, barcode, or glyph may be used in combination with QR code, barcode, or glyph tags or stickers to a same result. An analysis by which to understand delay causes from these crews, through scoring of unique individuals, teams, companies, aircraft types, and other factors may also be provided.

Referring now to the drawings, FIG. 1 illustrates an exemplary embodiment of an installation of a passive communication component such as, for example, an RFID tag or sticker 130 in proximity to an aircraft external access 110 in a fuselage 100 of an aircraft according to the inventive concepts disclosed herein. The disclosed schemes may involve emplacing an RFID tag or sticker 130 on a bulkhead 120 an inside of an aircraft in the vicinity of an access 110 through the fuselage 100 where a crew or crew member may enter and exit to "clock in" and "clock out." The RFID tag or sticker 130 may be programmed to emit a Unique Universal Identification (UUID) code associated with the specific tail number of the aircraft 100 in which the RFID tag or sticker 130 is installed. Each time a cooperating NFC-enabled mobile device intercepts this UUID, a tracking application in the cooperating mobile device may store a timestamp associated with a team member working the service, i.e., in control of the mobile device. Each aircraft may have one ID tag (and UUID) associated with the particular tail number, or each aircraft may have multiple ID tags, one associated with each penetration of the particular aircraft that is usable by individual members of any maintenance crew, including, but not limited to, the cleaning crew, for entry to, and egress from, the aircraft cabin. In embodiments, the RFID tag or sticker 130 may be placed solely in a vicinity of the main access door (generally in the manner shown in FIG. 1), and all members of a particular crew may be required to ingress and egress through that particular portal in order to be clocked in and clocked out. Although the above discussion focusses on reading an RFID tag or sticker 130, the inventive concepts disclosed herein are equally applicable to reading QR codes, barcodes, glyphs and the like.

Figure 2:
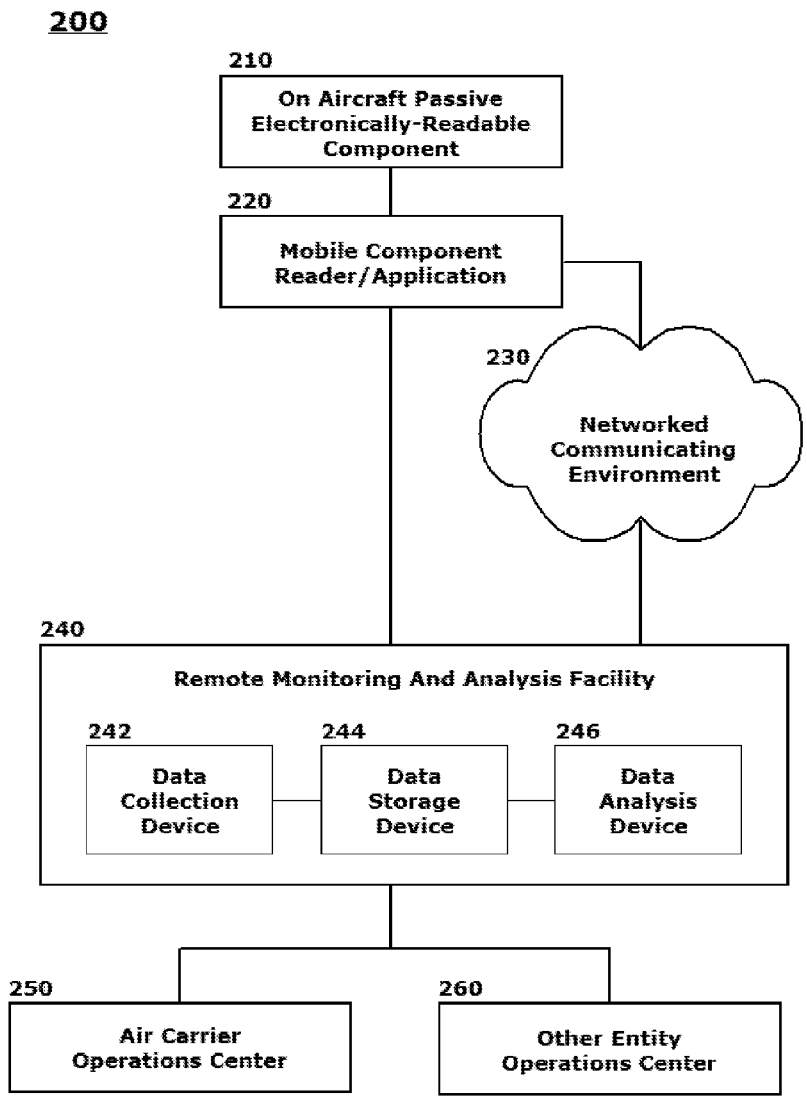
FIG. 2 illustrates an exemplary embodiment of a communication system for implementing a personnel tracking scheme according to the inventive concepts disclosed herein.

Referring now to FIG. 2, an exemplary embodiment of a communication system 200 for implementing an automated personnel tracking scheme according to the inventive concepts disclosed herein is shown. The system 200 includes an on aircraft passive electronically-readable component 210, which may be in a form of an RFID tag or sticker. As an individual passes in close proximity to the on aircraft passive electronically-readable component 210, such as through entry/exit via the aircraft access portal in a vicinity of which the on aircraft passive electronically-readable component 210 is mounted, a mobile component reader/application 220 may establish temporary or momentary communication with the on aircraft passive electronically-readable component 210 to provide the above-mentioned clock-in/clock-out functioning in any manner including that highlighted in the particular operating scenario outlined below.

Separately, the mobile component reader/application 220 may communicate with a remote monitoring and analysis facility 240 either directly or via some manner of networked communicating environment 230. These communications may occur in real time, near real time or according to a specific delay, for example, when an individual may initiate communication with the remote monitoring and analysis facility 240, or may report to the remote monitoring and analysis facility 240 to have the mobile component reader/application 220 "read." The remote monitoring and analysis facility 240 may include one or more of a data collection device 242, a data storage device 244 and a data analysis device 246.

Either or both of a server in the remote monitoring and analysis facility 240 or the mobile component reader/application 220 may implement a web service, which may be in a form of, for example, a SaaS (Software as a Service) solution. The web service may provide a means of capturing messages for the individual users' clock times upon entering and leaving the aircraft in the mobile component reader/application 220, or in the remote monitoring and analysis facility 240 through communication with the mobile component reader/application 220. A data collection service, which may be a component of the web service, may enable an entity operating the remote monitoring and analysis facility 240 to collect data with a data collection device 242, store the collected data in a data storage device 244, process and/or analyze the data with a data analysis device 246, and pass raw or analyzed data to one or more of an air carrier operations center 250, and an operations center or similar facility associated with one or more other monitoring entities (an other entity operations center 260). The entity controlling the remote operations and analysis facility 240 may administer the web service and essentially sell the data collection and analysis services to the air carriers and other entities. The web service may, in this manner, provide additional metric and scoring systems for the airline, air carrier and other entity customers, to improve airline, air carrier and airport operations tracking and delay predictions based on, for example, replenishment staff/crew delays.

In embodiments, a replenishment crew may trigger an event by tapping a mobile device housing the mobile component reader/application 220 to the on aircraft passive electronically-readable component 210, which may be in a form of an RFID tag or sticker on or near the aircraft door. This action may cause the mobile component reader/application 220 application to save the local clock time and the UUID on the aircraft. When the mobile device connects to the remote monitoring and analysis facility 240 via a wired or wireless connection, including, for example, a Wi-Fi network node or cellular network connection, the mobile component reader/application 220 on the mobile device may update the data collection SaaS in the remote monitoring and analysis facility 240. This may be, for example, via an HTTP POST-like response to the web service that may, in turn, send confirmation to the mobile component reader/application 220 that information regarding the tap was remotely received and logged. Any commercially available data analysis application or algorithm, such as, for example, Apache Cassandra™ and Apache Spark Streaming™ or Apache Storm Streaming™, may be usable to aggregate timing information, assign scores, update prediction delays, and generate performance metrics for individuals, teams, companies, aircraft, air carriers and airports. Push notifications to web services and mobile applications may be provided to update airlines, air carriers or airports with regard to this delay scoring. A user could employ a user's communication or computing device to request a current status on of an aircraft on a turnaround from cleanup crews tracked to be involved in the cabin cleanup tasks and to track further how a team performs, at least with respect to a time to complete the tasks.

The disclosed schemes provide a comparatively simple and inexpensive solution that can be quickly deployed by attaching the above-described uniquely identifiable readable tags in a doorway of an aircraft to provide positive monitoring of movement of personnel (e.g., the cleaning crew) to and from an interior of the aircraft via the monitored portal. Regarding the mobile devices included in the system, such mobile devices are already likely already deployed with the individuals for other uses. A cleaning crew or other aircraft services component that, for example, traverses the entry door where the individually-coded RFID chip may be mounted could be monitored based on the signal from that RFID chip to the individually-carried mobile devices of the individuals in the cleaning or other services crews. The simplicity of the disclosed solution is that every individual in a particular maintenance or cleaning crew having anything to do with the inside of the cabin or cockpit of the aircraft during a turnaround would necessarily need to traverse the doorway where the passive RFID chip is mounted. A company could specify that any individual in a particular cleaning crew, or the entire cleaning crew may be monitored. The disclosed schemes make it easy to drill down to any particular level granularity that an air carrier or other individual user entity may desire with regard to tracking, monitoring and notification.

It should be understood that the ability to determine passage of individual crewmembers executing particular tasks onto and off of the aircraft may allow the system 200 to provide an objective metrics regarding (1) whether and when the tasks are being completed, and (2) when the completion of those tasks is accomplished, in a particularly timely manner. The granularity here can track the individual staff members, and the team leader leading the staff, onto and off of the aircraft in a manner that is not available at present. Any elapsed time calculation then is a byproduct of that individual clock-in and clock-out tracking.

A particular team member, or all team members, may have a particular mobile application input into their respective mobile devices as a condition of being members of the maintenance crew. In an instance of a team leader only being tracked, standard procedures may be that the team leader be the first individual on and the last individual off the aircraft as part of the cleaning crew. Such implementing particulars, however, may be left to be captured in individual operating procedures that do not affect the scope of coverage of the inventive concepts disclosed herein. The particularly disclosed systems, methods and schemes provide access to information that is desired by the particular participating entities to track. The disclosed schemes are locally vehicle-centric in order that movement of the vehicle, generally an aircraft, to a particular geographic point is not used for implementation of the tracking schemes according to the inventive concepts disclosed herein.

The mobile device can be separately remotely real-time monitored via a cellular, or other communicating network. Otherwise, the tracking information may be locally downloaded at a centralized facility at a later time if all that is desired is an analysis of, for example, time on board and the like for later analytic purposes.

In a first instance, the disclosed schemes are able to discern when a crew is on and off the aircraft in real time in order to allow "observation" of a particular turnaround progress. Further, analysis may be undertaken to assess metrics regarding the efficiency and the appropriateness of the time that a particular crew spends working on the particular aircraft, or fleet of aircraft. Collected data may be used analytically to rank and grade particular crews and their capabilities, as appropriate. Particular metrics may be assigned and there may be a capability by which to discern what particular tasks undertaken by the maintenance crew for the cleaning crew are particularly time-consuming. Further, advanced information may be able to be melded with dispatching of the cleaning crew, for example, to a particular aircraft in instances where particularly large numbers of newspapers and magazines may need to be taken off the aircraft, or in instances where turbulence may have led to additional "soiling" of the cabin that may necessarily need to be addressed. It is generally presumed today, strictly based on a lack of any ability to track the interaction of the cleaning crew with the rest of the turnaround components, and with the aircraft itself, that the delays, any delays, in the turnaround may be attributable to the actions, or inaction, of the cleaning crew. Implementation of the inventive concepts disclosed herein may serve to validate these presumptions or may otherwise cause the air carriers to refocus their concerns with the progress of turnarounds to other "culprits." The current difficulty is that no available information exists other than information that may be laboriously, and therefore randomly, manually collected regarding this particular pursuit.

Real-time monitoring may be provided to the airlines, the airports, and to the companies overseeing the crews, i.e., the back offices of the airlines and the cleaning crews. Provision of information to the cleaning crew back end may afford an additional opportunity to monitor actual, in process, operations of their deployed crews. In a sophisticated monitoring environment, a first entry of a particular crew through the access door communicating between the attached passive RFID chip and the mobile device of, for example, the crew leader, may begin any lapsed timer or in the cleaning crew back office in order that at some particular elapsed time, and inquiry may be made regarding why the particular cleaning evolution is not indicated, as yet, as having been completed. There may be a capacity by which also to incentivize efficiency based on active, aggressive, and real-time monitoring internal to the cleaning company. The number of benefits and uses of the information available from the inventive concepts disclosed herein is fairly limitless.

Currently-employed analytics do not have automated access to the necessary piece of information provided by the inventive concepts disclosed herein by which to discern whether a particular aircraft turnaround is being undertaken in a most efficient manner. There is currently no manner by which to assess whether there is, for example, some real-time interference between operations of the cleaning crew, and operations of other entities involved in a particular turnaround. Does the cleaning crew, for example, fall to lower priority based on other actions that are being undertaken? Is there, for example, some real-world constraint at a particular parking section, or parking space, on an airport tarmac that leads to less efficiency in a manner that was unforeseen and/or measurable? Once this piece of information is of made available, it can then be correlated over time, in a manner that may lead to additional efficiencies, or at least identification of particular shortfalls in turnaround operations. There may be a predictive quality in which extra time could be built into the turnaround based on any one of a number of factors that once fully measurable may foretell particular difficulties.

In dealing with a multi-variable time constrained event such as an aircraft turnaround, lack of visibility into one of those metrics particularly affecting the time constrained event reduces a capacity by which to efficiently plan for and undertake the involved evolution and related evolutions. One unforeseen interruption in the back-to-back scheduling of evolutions in this manner can lead to a cascading effect over the course of an operating period. Today, absent a cumbersome manual reporting process, it is impossible to provide a reasonable breakdown of the individually-involved efforts.

Figure 3:
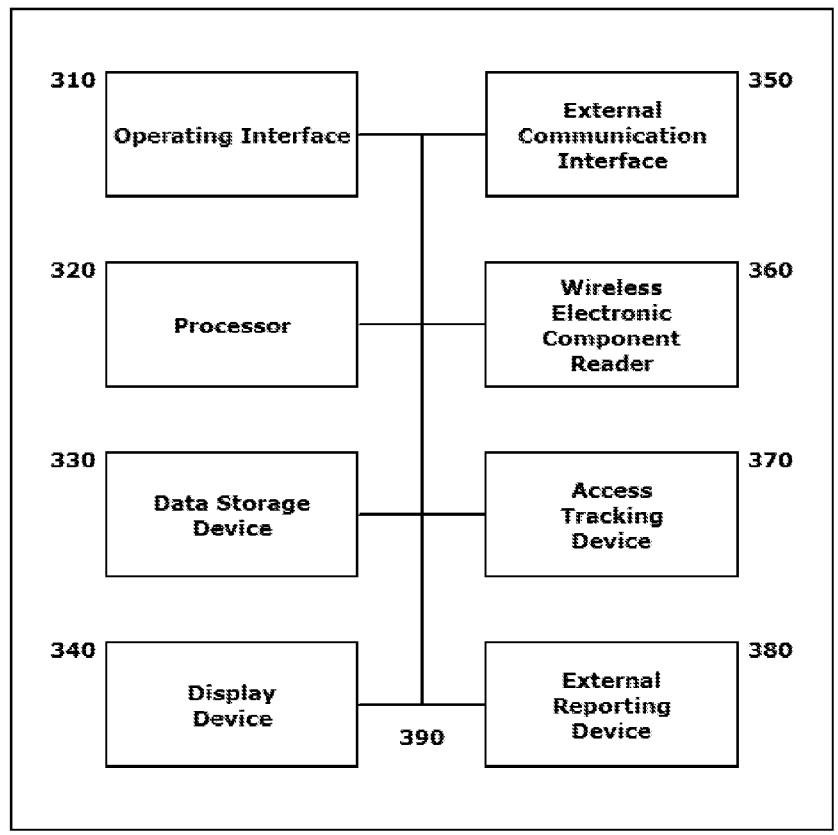
FIG. 3 illustrates an exemplary embodiment of a mobile device including a wireless electronic component reader by which an automated personnel tracking scheme according to the inventive concepts disclosed herein may be implemented.

Referring now to FIG. 3, an exemplary embodiment of a mobile device 300 includes a wireless electronic component reader 360 by which an automated personnel tracking scheme according to the inventive concepts disclosed herein may be implemented.

The mobile device 300 includes an operating interface 310 by which system commands may be introduced into the mobile device 300 by one or more users. Such an operating interface 310 may be a part, or a function, of a graphical user interface (GUI) integral to the mobile device 300. The operating interface 310 may take the form of any commonly-known user-interactive device by which a user input and/or commands are input to a mobile device 300 for processing and communicating functions of the mobile device 300. These commonly-known user-interactive devices may include, but not be limited to, keyboards or touchscreens, a microphone for providing verbal commands, or any other commonly-known operating interface device, including wearable I/O devices.

The mobile device 300 may include a local processor 320 for carrying out the individual operations and functions of the mobile device 300. The processor 320 may reference, for example, user inputs via the operating interface 310 to execute certain processing and communicating functions in the mobile device 300.

The mobile device 300 may include a data storage device 330. Such a data storage device 330 may be used to store data or operating programs to be used by mobile device 300, and specifically the processor 320, in carrying into effect the disclosed operations and functions, as well as the standard processing and communicating functions of the mobile device 300. The data storage device 330 may be used to temporarily store information regarding clock-in/clock-out of the mobile device 300 when momentary or temporary communications established between the mobile device 300 and a wireless passive communicating component (RFID tag or sticker) mounted at an access point generally in the manner described above.

The data storage device 330, although pictured as essentially integral to the mobile device 300, may include cloud-based data storage components, or otherwise may be in a form of a random access memory (RAM) or another type of dynamic storage device (actual or virtual) that is capable of storing updatable information, and for separately storing instructions for execution of system operations by, for example, processor 320 in the mobile device 300. The data storage device 330 may also include a read-only memory (ROM), which may include a conventional ROM device, a virtual ROM or another type of static storage device that stores static information and instructions for processor 320. It is anticipated that the data storage device 330 according to the disclosed schemes may generally be provided integrally to the mobile device 300, but the data storage device 330 may also be provided external to, and in wireless communication with, other system components of the mobile device 300.

The mobile device 300 may include a display device 340, which may be configured as one or more conventional mechanisms that output information to a user, including, but not limited to, a digital data display screen associated with the mobile device 300. Such a display device 340 may be provided for a user, for example, to interact with the mobile device 300 and particularly to provide instructions, operations and/or feedback regarding a progress of the automated personnel tracking scheme according to the inventive concepts disclosed herein.

The mobile device 300 may include one or more external communication interfaces 350 by which the mobile device 300 may communicate with other network nodes, including according to wireless (Wi-Fi and other) communicating protocols or according to cellular communicating protocols. In embodiments, communication with a remote tracking and analysis facility for data collection from the mobile device 300 may be established via one or more of the external communication interfaces 350.

The mobile device 300 may include one or more of a series of particularized automated personnel tracking scheme implementing modules. Each of the below described modules may be, for example, a physical implementation, a virtual implementation, or a functional implementation, of a particular task undertaken by the processor 320 in the mobile device 300. In this regard, each of these modules may comprise a cloud-based server component or a physical server component as a stand-alone device, or as a function of a more generalized processor 320.

The mobile device 300 may include a wireless electronic component reader 360 that may be usable to communicate directly with a wireless passive communicating component mounted in a vicinity of an access to, for example, an aircraft cabin by establishing momentary or temporary communication with the wireless passive communicating component generally in the manner described above. The wireless electronic component reader 360 may be in the form of an NFC device particularly capable of communicating with an RFID sticker or tag mounted in the vicinity of the access.

The mobile device 300 may include an access tracking device 370. The access tracking device may be in the form of a web service application as described above that may record an occurrence of a clock in and/or a clock out based on communication between the wireless electronic component reader 360 and the wireless passive communicating component mounted in a vicinity of the access. The presence of, for example, the mobile device 300 at a particular location associated with the wireless passive communicating component may be thus verified. The access tracking device 370 may additionally provide a capability for first-level analysis to, for example, determine an elapsed time between a clock in and a clock out cycle. The access tracking device 370 may be programmed to provide such other services as may support local or remote data analytics based on the access information collected in the mobile device 300.

The mobile device 300 may include an external reporting device 380 which may be usable to format raw data, first level analyze data, or simply alert information to provide via an external communication interface 350 to a remote location for data collection, additional analysis, and down range reporting to one or more contracting entities desiring to obtain access information in a raw or analyzed form from the mobile device 300 according to the discussion above regarding the inventive concepts disclosed herein.

All of the various components of the mobile device 300, as depicted in FIG. 3, may be connected internally by one or more data/control busses 390. These data/control busses 390 may provide wired or wireless communication between the various components of the mobile device 300, whether all of those components are housed integrally in (which will be typical), or are otherwise external and connected to, other components of the mobile device 300.

It should be appreciated that, although depicted in FIG. 3 as an essentially integral unit, the various disclosed elements of the mobile device 300 may be arranged in any combination of sub-systems as individual components or combinations of components, integral to a single unit, or external to, and in wired or wireless communication with, the single unit of the mobile device 300. In other words, no specific configuration as an integral unit or as a support unit is to be implied by the depiction in FIG. 3. Further, although depicted as individual units for ease of understanding of the details provided in this disclosure regarding the mobile device 300, it should be understood that the described functions of any of the individually-depicted components may be undertaken, for example, by the processor 320 connected to, and in communication with, the data storage device 330, all of which may support communicate, store, analyze and forward operations in the mobile device 300.

Figure 4:
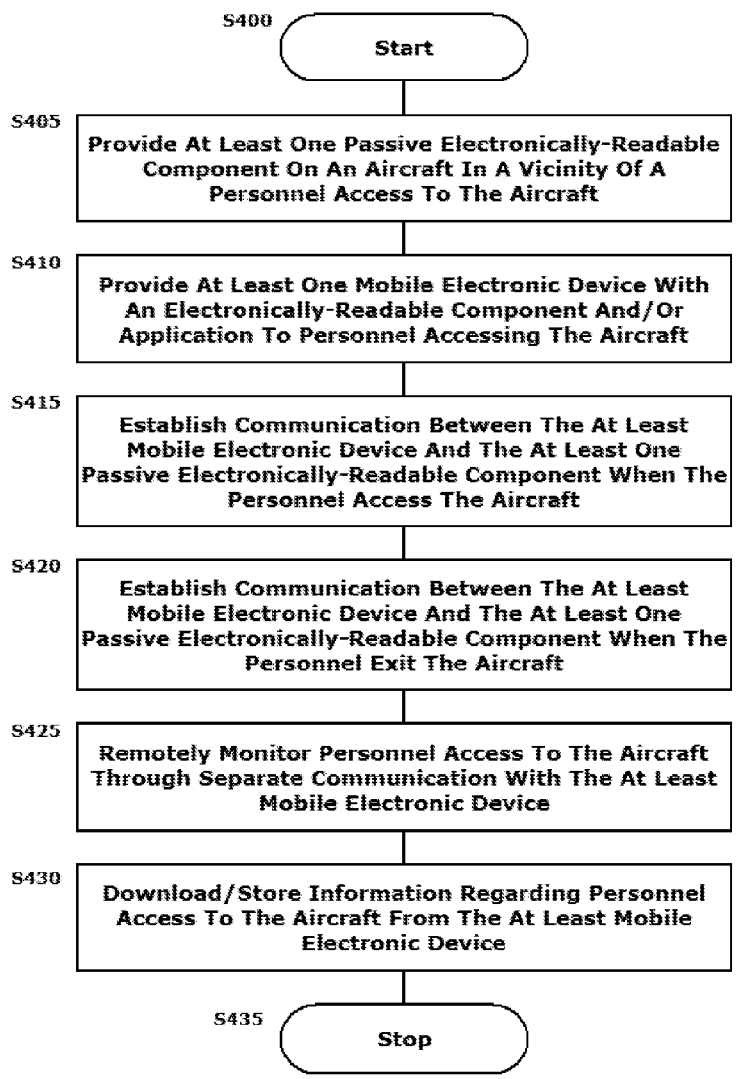
FIG. 4 illustrates a flowchart of an exemplary method for implementing an automated personnel tracking scheme according to the inventive concepts disclosed herein.

Referring now to FIG. 4, an exemplary flowchart of a method for automated personnel tracking is shown. Operation of the method commences at Step S400 and proceeds to Step S405.

In Step S405, at least one passive electronically-readable component may be provided on an aircraft in a vicinity of a personnel access to the aircraft, e.g., a main cabin door access to the passenger cabin. The at least one passive electronically-readable component may be in the form of an RFID tag, chip or sticker. Operation of the method proceeds to Step S410.

In Step S410, at least one mobile electronic device with an electronically-readable component and/or application may be provided to personnel accessing the aircraft. The at least one mobile electronic device may be configured to establish communication between the at least one mobile electronic device and the at least one passive electronically-readable component, when in proximity to one another. Operation of the method proceeds to Step S415.

In Step S415, communication may be established between the at least one mobile electronic device and the at least one passive electronically-readable component when the personnel in control of the at least one mobile electronic device passes in close proximity to the at least one passive electronically-readable component while accessing, for example, the main cabin of the aircraft. The initial establishment of communication between the at least one mobile electronic device and the at least one passive electronically-readable component may trigger a particular application in the at least one mobile electronic device to set an event marker that clocks in the individual with the at least one mobile electronic device for access to the aircraft cabin. Operation of the method proceeds to Step S420.

In Step S420, communication may be established between the at least one mobile electronic device and the at least one passive electronically-readable component when the personnel in control of the at least one mobile electronic device passes in close proximity to the at least one passive electronically-readable component while exiting the main cabin of the aircraft. This subsequent establishment of communication between the at least one mobile electronic device and the at least one passive electronically-readable component may trigger the particular application in the at least one mobile electronic device to set an event marker that clocks out the individual with the at least one mobile electronic device, essentially ending the period of access of the individual to the aircraft cabin. Operation of the method proceeds to Step S425.

In Step S425, t sever communication may be established with the at least one mobile electronic device to remotely monitor personnel access to the aircraft based on the interaction of the at least one mobile electronic device and the at least one passive electronically-readable component in the manner described above. Operation of the method proceeds to Step S430.

In Step S430, information regarding personnel access to the aircraft maybe downloaded and remotely stored for a number of beneficial purposes including, but not limited to, later analysis of the access information, and/or reporting of access metrics to external entities including, for example, airlines, air carriers, airports and cleaning crew management. Operation of the method proceeds to Step S455, where operation of the method ceases.

The disclosed embodiments may include a non-transitory computer-readable medium storing instructions which, when executed by a processor in a mobile device, or in a remote location, may cause the processor to execute all, or at least some, of the steps of the method outlined above.

Those skilled in the art will appreciate that other embodiments of the disclosed subject matter may be practiced in providing automated personnel tracking according to the inventive concepts disclosed herein using many and widely varied system components.

The exemplary depicted sequence of executable instructions, or associated data structures, represents one example of a corresponding sequence of acts for implementing the functions described in the steps of the above-outlined exemplary method. The exemplary depicted steps may be executed in any reasonable order to carry into effect the objectives of the disclosed embodiments. No particular order to the disclosed steps of the method is necessarily implied by the depiction in FIG. 4, except where execution of a particular method step is a necessary precondition to execution of any other method step.

Although the above description may contain specific details, they should not be construed as limiting the claims in any way. Other configurations are part of the scope of the disclosed embodiments. Accordingly, the appended claims, and their legal equivalents, should only define the disclosed embodiments, rather than any specific example given.

We claim:

1. A tracking system, comprising:
   at least one passive wireless identification device placed at a personnel access point;
   a mobile device configured to establish communication with the at least one passive wireless identification device when the mobile device passes through the personnel access point; and
   a remote data collection device configured to
   communicate with the mobile device via a first communication connection; and
   record occurrences of established communication between the mobile device and the at least one passive wireless identification device via the first communication connection.

2. The system of claim 1, the at least one passive wireless identification device being at least one of programmed and printed with a unique identifier for the personnel access point with which the at least one passive wireless identification device is placed in proximity.

3. The system of claim 1, the at least one passive wireless identification device comprising a Radio-Frequency Identification (RFID) chip.

4. The system of claim 3, communication being established between the mobile device and the at least one passive wireless identification via a second communication connection, the second communication connection being according to a Near-Field Communication (NFC) protocol.

5. The system of claim 1, the at least one passive wireless identification device being one of a QR code, barcode and glyph that is visibly scanned via optical communication with the mobile device.

6. The system of claim 1, the mobile device being further configured to communicate the occurrence of the established communication between the mobile device and the at least one passive wireless identification device to the remote data collection device in real time.

7. The system of claim 6, the remote data collection device being configured to forward an acknowledgment to the mobile device of the recording of the occurrence of the established communication between the mobile device and the at least one passive wireless identification device.

8. The system of claim 1, further comprising a storage device in communication with the remote data collection device for storing a database of a record of occurrences of established communication between a plurality of mobile device and a plurality of passive wireless identification devices.

9. The system of claim 8, further comprising a data analysis device that is configured to analyze the database of the record of occurrences of established communication between the plurality of mobile device and the plurality of passive wireless identification devices, and to output a result of the analysis.

10. The system of claim 9, the data analysis device being further configured to communicate the result of the analysis to end-users via a third communication connection.

11. The system of claim 1, the personnel access point being a cabin door on an aircraft.

12. A method for tracking personnel, comprising:
    providing at least one passive wireless identification device at a personnel access point;
    establishing communication between a mobile device and the at least one passive wireless identification device when the mobile device passes the personnel access point;
    communicating occurrences of the established communication between the mobile device and the at least one passive wireless identification device to a remote data collection device via a communication connection;
    recording the occurrences of the established communication between the mobile device and the at least one passive wireless identification device in the remote data collection device; and
    outputting from the remote data collection device data based on the recorded occurrences of the established communication between the mobile device and the at least one passive wireless identification device.

13. The method of claim 12, the at least one passive wireless identification device being at least one of programmed and printed with a unique identifier for the personnel access point where the at least one passive wireless identification device is placed.

14. The method of claim 12, the at least one passive wireless identification device comprising a Radio-Frequency Identification (RFID) chip.

15. The method of claim 14, the establishing communication being according to a Near-Field Communication (NFC) protocol.

16. The method of claim 12, the at least one passive wireless identification device being one of a QR code, barcode and glyph that is visibly scanned via optical communication with the mobile device.

17. The method of claim 12, the mobile device being configured to communicate the occurrence of established communication between the mobile device and the at least one passive wireless identification device to the remote data collection device in real time,
    the method further comprising communicating an acknowledgment from the data collection device to the mobile device of the recording of the occurrence of the established communication between the mobile device and the at least one passive wireless identification device.

18. The method of claim 12, further comprising storing a database of a record of occurrences of established communication between a plurality of mobile device and a plurality of passive wireless identification devices in a storage device in communication with the remote data collection device.

19. The method of claim 18, further comprising:
analyzing, with the processor, the database of the record of occurrences of the established communication between the plurality of mobile device and the plurality of passive wireless identification devices; and
outputting a result of the analysis to an end-user via a third communication connection.

20. The method of claim 12, the personnel access point being a cabin door on an aircraft.

* * * * *